United States Patent [19]

Berndt

[11] Patent Number: 4,463,051
[45] Date of Patent: Jul. 31, 1984

[54] PROCESS FOR TEMPERATURE MONITORING A SUBSTRATE

[75] Inventor: Dieter R. Berndt, Neptune, N.J.

[73] Assignee: TRP Energy Sensors, Inc., New York, N.Y.

[21] Appl. No.: 363,913

[22] Filed: Mar. 31, 1982

[51] Int. Cl.$^3$ .................... B32B 5/16; C09D 11/00
[52] U.S. Cl. .................... 428/323; 106/21; 428/335; 428/328; 428/913
[58] Field of Search .................... 106/21; 116/207; 374/160, 162; 427/256; 428/328, 913, 334–336, 323, 3

[56] References Cited

U.S. PATENT DOCUMENTS

| | | | |
|---|---|---|---|
| 1,924,793 | 8/1933 | Laske | 106/287.18 |
| 1,939,232 | 12/1933 | Sheppard et al. | 106/194 |
| 3,698,234 | 10/1972 | Allinikov | 374/162 |
| 4,072,055 | 2/1978 | Elliott | 374/160 |
| 4,355,070 | 10/1982 | Oeda | 428/328 |

OTHER PUBLICATIONS

Chem. Abst. 47:6582b, Kubota, "Temperature-Indicating Coating Material", 1953.

*Primary Examiner*—Theodore Morris
*Attorney, Agent, or Firm*—Louis E. Marn

[57] ABSTRACT

There is disclosed these and other objects of the present invention are achieved by coating a substrate with a temperature-response composition comprised of a colloidal suspension of inorganic compounds of a particle size less than 20 microns and greater than 5 microns and of a desired melting temperature suspended in a water-based solution of a water soluble organic compound wherein the temperature-responsive composition is formed by blending of from 30 to 70 parts of the inorganic compound from 70 to 30 parts of the water-based solution.

9 Claims, No Drawings

PROCESS FOR TEMPERATURE MONITORING A SUBSTRATE

FIELD OF THE INVENTION

The invention relates to temperature-responsive compositions, and more particularly to temperature-responsive compositions exhibiting an irreversible visually observable color change once raised to a temperature above a preselect temperature level and process for manufacturing same.

BACKGROUND OF THE INVENTION

The use of temperature-responsive paint compositions for diverse applications, such as in the electrical art, has been disclosed, for example in U.S. Pat. No. 1,924,793 to Laske wherein there is formulated a paint comprised of a mixture of litharge with thiourea. The temperature-responsive characteristics of mesomorphic compositions, and in paticular, the cholesteric and nematic types, have been recognized in the prior art, such as disclosed in U.S. Pat. No. 3,576,761 to Davis. The encapsulation of mesomorphic compositions is disclosed, inter alia, in U.S. Pat. Nos. 2,800,457 and 3,341,466. Incorporation of mesomorphic compositions in polymer matrixes is disclosed in U.S. Pat. Nos. 3,600,060 and 3,620,889.

In U.S. Pat. No. 3,697,297 to Churchill et al, there is disclosed a process for the microencapsulation of mesomorphic compositions in a thermoplastic polymer matrix to form minute capsules which when subjected to conductive heat transfer exhibits a reversible irridescence color condition indicative of a certain characteristic temperature range. Such temperature range varies in accordance with the types and mixtures of the mesomorphic compositions.

The use of mesomorphic compositions generally recognizes the physical property of reversibility when transitting the temperature range between the truly crystalline state and the isotropic state, although the hereinabove mentioned Davis reference suggests the use of mesomorphic compositions and in particular the cholesteric types, to record a permanent temperature change by the use of oil soluble dyes for low temperature application, e.g. below about 100° C.

It has been proposed to use materials dissolved in an organic solvent, however once applied to a substrate with concomitant evaporation of the solvent results in a coating which may be readily removed by brushing thereby obviating any consideration for permanent uses.

Mesomorphic or "liquid crystalline" materials have long been known and have been classified into three types: smectic, nematic, and cholesteric. The cholesteric types exhibit a number of optical properties, one of which being the scattering of white light, varying with temperature over a certain range, depending upon the particular cholesteric material. The formulation of mesomorphic compositions to achieve a desired temperature at which the mesomorphic composition clears is disclosed in the hereinabove mentioned U.S. Pat. No. 3,620,899 to Baltzer.

In a copending application Ser. No. 363,909 there is disclosed a process for forming micro-capsules of a liquid crystalline composition having a preselected isotropic temperature whereby once the liquid crystalline composition transits into the isotropic phase, the liquid crystalline composition thereafter essentially visually indicates such a transition notwithstanding a subsequent lowering of temperature to below the isotropic temperature. The micro-capsules of the liquid crystalline composition are sized from 5 to 20 microns, and preferably 5 to 10 microns, and are comprised of a water-soluble encapsulating material surrounding the liquid crystalline composition wherein the encapsulating material is formed about the liquid crystalline composition at a temperature above its isotropic temperature. In one embodiment thereof the micro-capsules are case-hardened by contact with a cross-linking or dehydrating agent following microencapsulation.

Liquid crystalline compositions are relatively expensive and are relatively sensitive to contamination and may lose their temperature-responsive property. Micro-encapsulations techniques requiring time controlled processing operations, as well as careful attention to processing conditions to produce effective micro-capsules of liquid crystalline compositions. The liquid crystalline compositions are temperature-responsive to narrow and generally lower temperature ranges whereas many industrial applications only require a response to broader temperature ranges and at higher temperatures.

OBJECTS OF THE INVENTION

An object of the present invention is to provide an inexpensive temperature-responsive composition.

Another object of the present invention is to provide a temperature-responsive composition of a broad temperature response range.

Still another object of the present invention is to provide a temperature-responsive composition substantially insensitive to contamination.

Yet another object of the present invention is to provide a temperature-responsive composition readily processed from inexpensive and readily available raw materials.

A further object of the present invention is to provide a temperature-responsive composition having greater industrial use applications.

A still further object of the present invention is to provide a temperature-responsive composition readily applied to a substrate to be temperature monitored.

Another object of the present invention is to provide a temperature-responsive composition capable of withstanding environmental effects once applied to a substrate to be temperature monitored.

SUMMARY OF THE INVENTION

These and other objects of the present invention are achieved by a temperature-response composition comprised of a colloidal suspension of inorganic compounds of a particle size less than 20 microns and greater than 5 microns and of a desired melting temperature suspended in a water-based solution of a water soluble organic compound wherein the temperature-responsive composition is formed by blending of from 30 to 70 parts of the inorganic compound with from 70 to 30 parts of the water-based solution.

DETAILED DESCRIPTION OF THE INVENTION

Generally, the inorganic compounds having a preselect melting point used in the present invention are essentially white in color exhibiting maximum ambient light scattering. Examples of such inorganic materials and their melting points are set forth in Table I below:

TABLE I

| Inorganic Compound | Melting Pt. (—°C.) |
|---|---|
| Chromium Chloride | 203 |
| Mercuric iodide | 260 |
| Ferric chloride | 282 |
| Silver iodide | 557 |
| Cuprous Iodide | 604 |
| Ferrous chloride | 671 |
| Magnesium chloride | 707 |
| Zinc borate | 982 |

The water-based solutions are comprised of water soluble organic compounds such as the cellulose ethers including methylcellulose. Such water-soluble organic compounds are soluble in all proportions with water. As the binder or water based solution for a water insoluble organic compound of the desired melting point, one part of the water soluble organic compound is admixed with from 4 to 6 parts of water to form dilute solutions of the water soluble organic compound.

The inorganic compound of the desired melting point is added to the dilute solution of the water soluble organic compound in an amount of from 30 to 70 parts of the inorganic compound to 70 to 30 parts of the dilute solution of the water soluble organic compound. Generally, the inorganic compound is of a particle size of from 100 to 1000 microns to facilate initial blending of the resulting admixture. Blending of the admixture is effected at a temperature of from 40° to 50° C. and is continued until the inorganic compounds are of a particle size of less than 20 microns and greater than 5 microns, preferably 5 to 10 microns, generally for a time period of from 24 to 36 hours. To achieve such particle size, blending is effected in a ball mill with a ball size of not less than about ½ inch or may be shear milled as disclosed in the hereinabove mentioned copending application. The temperature-responsive composition of the present invention is formulated to a viscosity of about 15 to 30 poise to permit facile coating, such as by a brush, onto a substrate to be temperature-sensed or monitored.

The temperature-responsive composition of the present invention may be formulated with either oil or water soluble dyes or pigments to enhance visual acuity or observation of the temperature-responsive composition. In this regard, of from 2 to 5 percent by volume of such a dye or pigment is added to the admixture to facilitate optical recognition, it being understood that the dye or pigment may be added to either the inorganic compound or to the water-based solution prior to admixing thereof.

The dyes and pigments which may be readily incorporated into the liquid vehicle include the azo-compounds including the mono-, di-and/tri-axo forms; azine (yellow), shiazmi (green), lactone (green), animobutones (yellow), anthraquinone (indigo) and diphenylmethane (blue).

In operation, the substrate to be temperature-sensed or monitored may be first provided with a layer of a desired color, e.g. black, by coating the substrate at a desired location with a latex or lacquer based paint.

Thereafter, a temperature-responsive composition including the inorganic compound of the desired temperature of temperature monitoring or sensing as represented by the melting point thereof is overlayed the black layer, the painted layer being of a thickness of from 0.5 to 2.0 mils. The temperature-responsive composition being essentially white blocks out the black base layer, depending on course of totality of application. The temperature-responsive composition retains its essentially white color until such time when the substrate is subjected to a thermal event to raise the temperature of the inorganic composition above its melting point whereupon degradation occurs, and thus the visually recognizable situation, i.e. the black layer becomes visible indicative that the substrate was subject to a thermal event to a temperature above the desired or preselected temperature, of temperature monitoring.

Upon cooling, the temperature-responsive composition does not revert to its initial color thereby irreversibly indicating occurrence of the thermal event.

Numerous modifications and variations of the invention are possible in light of the above teachings and therefore the invention may be practiced otherwise than as particularly described.

What is claimed:

1. A process for temperature monitoring a substrate to ascertain exposure to a thermal event of a predetermined temperature level, which comprises:
    coating a portion of said substrate with a temperature-responsive composition exhibiting an irreversible visual color change once subjected to a temperature above the preselect temperature level and comprising a colloidal suspension of particles of a size greater than 5 microns and less than 20 microns of an essentially white, inorganic material in a water-based solution of a water soluble organic compound, said inorganic material having a melting point slightly below said predetermined temperature level.

2. The process as defined in claim 1 wherein said particles are of a size of from 5 to 10 microns.

3. The process as defined in claim 1 wherein said particles are present in an amount of from 30 to 70 volume percent of said temperature-responsive composition.

4. The process as defined in claim 1 wherein said temperature-responsive composition is of a viscosity of from 15 to 30 poise.

5. The process as defined in claim 1 wherein further including a dye in an amount of from 2 to 5 percent by volume of said temperature-responsive composition.

6. The process as defined in claim 1 wherein water-based solution is comprised of from 10 to 30 volume percent of said water soluble organic compound.

7. The process as defined in claim 6 wherein said water soluble organic compound is methyl cellulose.

8. The process as defined in claim 1 wherein said temperature-responsive composition is coated to a thickness of from 0.5 to 2.0 mils. on said substrate.

9. The process as defined in claim 1 wherein said substrate is a visually different color than said temperature-responsive composition.

* * * * *